(12) United States Patent
Gantenbein et al.

(10) Patent No.: US 10,619,049 B2
(45) Date of Patent: Apr. 14, 2020

(54) PROCESS TO OBTAIN AN ULTRAFINE GCC WITH HIGH LIGHT SCATTERING PROPERTIES AND HIGH SOLID CONTENT

(71) Applicant: Omya International AG, Oftringen (CH)

(72) Inventors: Daniel Gantenbein, Basel (CH); Patrick A. C. Gane, Rothrist (CH); Rolf Endre Orten, Molde (NO); Jan Philipp Weihs, Düdingen (CH); Philipp Hunziker, Loveland, OH (US); Asbjørn Høyem Amundsen, Molde (NO); Tommy Sandvik, Elnesvågen (NO); Bjørn Jensen, Bud (NO)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/538,373

(22) PCT Filed: Jan. 4, 2016

(86) PCT No.: PCT/EP2016/050006
§ 371 (c)(1),
(2) Date: Jun. 21, 2017

(87) PCT Pub. No.: WO2016/110459
PCT Pub. Date: Jul. 14, 2016

(65) Prior Publication Data
US 2018/0009991 A1    Jan. 11, 2018

Related U.S. Application Data

(60) Provisional application No. 62/103,095, filed on Jan. 14, 2015.

(30) Foreign Application Priority Data

Jan. 7, 2015   (EP) .................... 15150367

(51) Int. Cl.
*C01F 11/18*   (2006.01)
*C09C 1/02*    (2006.01)
*C08K 3/26*    (2006.01)

(52) U.S. Cl.
CPC .............. *C09C 1/021* (2013.01); *C01F 11/18* (2013.01); *C01F 11/185* (2013.01); *C08K 3/26* (2013.01); *C09C 1/02* (2013.01); *C01P 2004/51* (2013.01); *C01P 2004/61* (2013.01); *C01P 2004/62* (2013.01); *C01P 2006/12* (2013.01); *C01P 2006/22* (2013.01); *C01P 2006/60* (2013.01); *C08K 2003/265* (2013.01)

(58) Field of Classification Search
CPC ...................................................... C09C 1/021
See application file for complete search history.

(56) References Cited

U.S. PATENT DOCUMENTS

| 4,166,582 A | 9/1979 | Falcon-Steward |
| 4,278,208 A | 7/1981 | Falcon-Steward |
| 4,793,985 A | 12/1988 | Price et al. |
| 5,533,679 A | 7/1996 | Golley |
| 5,833,747 A * | 11/1998 | Bleakley ................. C09C 1/021 106/464 |
| 6,140,376 A | 10/2000 | Golley et al. |
| 6,620,856 B1 | 9/2003 | Mortimer et al. |
| 8,324,301 B2 * | 12/2012 | Cavalier ................. B82Y 30/00 423/430 |
| 2010/0004405 A1 | 1/2010 | Kelkar |
| 2011/0105670 A1 | 5/2011 | Gane et al. |

FOREIGN PATENT DOCUMENTS

| CA | 2187471 | 4/1997 |
| EP | 0795588 A1 | 9/1997 |
| EP | 0850685 A2 | 7/1998 |
| EP | 0894836 A1 | 2/1999 |
| EP | 0894844 A1 | 2/1999 |
| EP | 2143688 A1 | 1/2010 |
| EP | 2292701 A1 | 3/2011 |
| FR | 2377844 | 1/1978 |
| GB | 2275876 A | 3/1993 |
| KR | 10-2014-0027510 | 3/2014 |
| WO | 00390029 A2 | 7/2000 |
| WO | 2013/007717 A1 | 1/2013 |

OTHER PUBLICATIONS

International Search Report dated Feb. 22, 2016 for PCT/EP2016/050006.
Written Opinion of the International Searching Authority dated Feb. 22, 2016 for PCT/EP2016/050006.

* cited by examiner

*Primary Examiner* — Stuart L Hendrickson
(74) *Attorney, Agent, or Firm* — ALGM LLP; Harry J. Guttman (57) ABSTRACT

The present invention relates to a process for the manufacturing of a calcium carbonate-comprising material, a calcium carbonate-comprising material obtained by a process as well as the use of the calcium carbonate-comprising material for paper filler and paper coating applications, cigarette paper applications, for plastics applications or in paints, coatings, adhesives, replacement of titanium dioxide, preferably in paints, sealants, food, feed, pharma, concrete, cement, cosmetic, water treatment and/or agriculture applications.

21 Claims, 2 Drawing Sheets

Fig. 1

Fig. 2

PROCESS TO OBTAIN AN ULTRAFINE GCC WITH HIGH LIGHT SCATTERING PROPERTIES AND HIGH SOLID CONTENT

CROSS-REFERENCE TO RELATED APPLICATIONS

This is a U.S. national phase of PCT Application No. PCT/EP2016/050006, filed Jan. 4, 2016, which claims priority to European Application No. 15150367.9, filed Jan. 7, 2015 and U.S. Provisional Patent Application No. 62/103,095, filed Jan. 14, 2015.

The present invention relates to a process for the manufacturing of a calcium carbonate-comprising material, a calcium carbonate-comprising material obtained by a process as well as the use of the calcium carbonate-comprising material for paper filler and paper coating applications, cigarette paper applications, for plastics applications or in paints, coatings, adhesives, replacement of titanium dioxide, preferably in paints, sealants, food, feed, pharma, concrete, cement, cosmetic, water treatment and/or agriculture applications.

Especially in the field of paper and board manufacturing ultrafine GCCs are highly desirable to obtain high gloss, high light scattering and highly absorptive coating structures.

However, such products can be only obtained in a process in which no dispersant is present. In order to overcome issues with high viscosity the aqueous suspension of the GCC has thus to be diluted with water. As a result, a lot of water has to be removed after grinding. Typical dewatering methods involve centrifugation or evaporation. As a consequence, the obtained product also has a very steep particle size distribution. In many occasions, it is very desirable to have a product that consists of particles which are very narrow distributed around a specific size.

The problem with this approach is that due to the ultrafine and even nano-sized (<100 nm) dimensions of the obtained product, a part of this material is separated during centrifugation, actually losing part of the needed ultrafine fraction. In addition, the output after the centrifuge is only around 50% and more water has to be removed in a second process step. Thus, this approach causes high expenses and is limited to a maximum solid content of 65% for the centrifugation process. The problem with the evaporation process is that it is highly energy consuming and in absence of a dispersant limited to a maximum solid content of 65%. The limitation in solid content to 65% is mainly due to increasing viscosity during evaporation.

For example, an at the time of filing the present application unpublished European patent application (application number: 14169923.1, filed on May 26, 2014) of the same applicant as the present application refers to crumbles comprising calcium carbonate and a process for the manufacturing of these crumbles comprising the steps a) providing at least one calcium carbonate-containing material, b) wet grinding the at least one calcium carbonate-containing material and c) mechanical dewatering of the aqueous slurry to obtain crumbles.

CA 2,187,471 relates to a method for the preparation of a precipitated calcium carbonate (PCC) for use as a pigment in paper coating compositions, the method comprising the steps of (a) carbonating an aqueous lime-containing medium to produce an aqueous suspension of a PCC predominantly in a selected crystal form, (b) at least partially dewatering the PCC-containing suspension; and (c) subjecting the PCC-containing suspension to comminution by high shear attrition grinding with an attrition grinding medium. The dewatering step (b) is preferably carried out using a pressure filter device operating at a pressure of at least 5 MPa, preferably at least 10 MPa. A pH reduction step may be applied after steps (b) and (c).

U.S. Pat. No. 4,793,985 refers to a process for producing ultrafine ground calcium carbonate in which a dry feed stone is slurried to a 15 to 60% by weight solids slurry and dispersed with an organic dispersant. The dispersed slurry is fed to an attrition mill where it is bead ground to 50 to 70% less than 2 µm. The ground calcium carbonate is classified in a centrifuge into a product stream having from 70 to 99% of its particles less than 2 µm and an underflow stream of larger particles. The product stream is treated with ozone which serves not only to increase the brightness of the product but to return the slurry to a non-dispersed state. The calcium carbonate slurry is then dewatered to produce a 58 to 69% solids product suitable for preparing a higher solids slurry or for spray drying.

EP 0894 836 A1 relates to a slurry consisting of (A) 25 to 70 wt.-% agglomerated, carbonate-containing pigment with a specific particle size distribution, (B) 0.1 to 1.0 wt.-% known or commercially available dispersant which prevents the agglomerated pigment breaking up again in the slurry and (C) water (to 100 wt.-%). Also claimed is a process for production of the slurry, this process inter alia comprises dewatering by using a filter press.

WO 00/39029 A2 refers to a method of producing a rheologically stable concentrated aqueous suspension of a particulate alkaline earth metal carbonate, the method comprises the following steps: (a) preparing a dilute aqueous suspension of the carbonate having a solids content of not more than 40% by weight; (b) dewatering the dilute aqueous suspension to form a carbonate suspension having a solids content in the range of from 45% to 65% by weight; (c) optionally mixing with the dewatered suspension formed in step (b) a dispersing agent for the carbonate to form a fluid suspension; (d) further dewatering the fluid suspension formed in step (b) by thermal evaporation under reduced pressure to raise the solids content of the suspension by a further differential amount of at least 5% by weight; and (e) after at least some of the dewatering in step (c) treating the suspension by a mechanical working process in which at least 1 kWhr per ton of carbonate on a dry weight basis is dissipated to refluidize the suspension.

EP 0 850 685 A2 relates to a method of producing a dispersed aqueous suspension of an inorganic particulate material which includes the steps of (a) preparing an aqueous suspension of calcium carbonate particles having a particle size distribution such that at least 35% by weight have an esd less than 2 µm, the solids concentration of the suspension being no more than 40% by dry weight; (b) concentrating the suspension by dewatering to increase the solids content to at least 60% by dry weight; and (c) adding a dispersing agent to the concentrated suspension to disperse the calcium carbonate particles.

EP 0 795 588 A1 refers to a staining colour containing 28 to 51 wt.-% water and 43 to 64 wt.-% carbonate pigment (I), especially calcium carbonate pigment (IA), and 6 to 8 wt.-% usual binder and usual additives. Also claimed is a method of producing the colour.

EP 0 894 844 A1 relates to a pigment dry product consisting of 96 to 100 wt.-% agglomerated pigment containing carbonate, and 0 to 4 wt. % residual moisture of water. Also claimed is the preparation of the above pigment dry product.

EP 2 292 701 A1 relates to a process for preparing an aqueous suspension of dispersed calcium carbonate, wherein the resulting coating of said suspension provides opaque properties or has a specific light scattering coefficient S. With increasing solids content the light scattering coefficient S decreases.

However, none of the foregoing documents explicitly mention efficient manufacturing methods for preparing calcium carbonate-comprising materials providing high gloss, high light scattering and highly absorptive coating structures and which allows for an efficient dewatering of the calcium carbonate-comprising materials.

Thus, there is a continuous need for calcium carbonate-comprising materials which provide an improved performance compared to existing calcium carbonate-comprising materials and especially a calcium carbonate-comprising material having high gloss, high light scattering and highly absorptive coating structures. Furthermore, it is desired to provide a process for the manufacturing of such calcium carbonate-comprising material which is efficient and allows for the provision of aqueous suspensions of high solids content and thus allows for sufficient dewatering of the system.

It is thus an object of the present invention to provide a process for the manufacturing of a calcium carbonate-comprising material. Another object may also be seen in the provision of a highly efficient process for the manufacturing of an ultrafine calcium carbonate-comprising material. A further object may be seen in the provision of a highly efficient process for the manufacturing of a calcium carbonate-comprising material having high solids content. Another object may be seen in the provision of a highly efficient dewatering of an aqueous suspension comprising a calcium carbonate-comprising material. A further object may be seen in the provision of a highly efficient process for the manufacturing of a calcium carbonate-comprising material having high gloss, high light scattering and highly absorptive coating structures and especially improved gloss and/or light scattering as compared to a calcium carbonate-comprising material prepared by a conventional process using evaporation or centrifugation.

One or more of the foregoing and other problems are solved by the subject-matter as defined herein in the independent claims. Advantageous embodiments of the present invention are defined in the corresponding sub-claims.

A first aspect of the present invention relates to a process for the manufacturing of a calcium carbonate-comprising material. The process comprises the steps of
a) providing a substantially dispersant-free aqueous suspension of at least one calcium carbonate-comprising material, wherein the aqueous suspension has a solid content in the range from 10.0 to 80.0 wt.-%, based on the total weight of the aqueous suspension;
b) wet-grinding the aqueous suspension as provided in step a) in at least one grinding step for obtaining an aqueous suspension of at least one calcium carbonate-comprising material having a weight median diameter $d_{50}$<0.4 µm;
c) dewatering the aqueous suspension as obtained in step b) by using a mechanical method to obtain a filter cake having a solid content in the range from 40.0 to 88.0 wt.-%, based on the total weight of the filter cake;
d) deagglomerating the filter cake obtained in step c);
e) adding at least one dispersing agent to the deagglomerated filter cake obtained in step d) and mixing the filter cake and the at least one dispersing agent to obtain an aqueous suspension having a solid content in the range from 50.0 to 80.0 wt.-%, based on the total weight of the aqueous suspension.

According to another aspect of the present invention, a calcium carbonate-comprising material obtained by the process, as described herein, is provided. In one embodiment, the calcium carbonate-comprising material has
i) a BET-surface area in the range from 8.0 to 30.0 m²/g, preferably 10.0 to 25.0 m²/g and more preferably 11.0 to 20.0 m²/g, and/or
ii) a content of particles <1 µm of >70 wt.-%, preferably >80 wt.-% and more preferably >85 wt.-%, and/or
iii) a Brookfield Viscosity in the range from 100 to 600 mPa·s, and/or
iv) a light scattering coefficient >175 m²/kg, preferably >190 m²/kg, more preferably >200 m²/kg, even more preferably >210 m²/kg, and most preferably >220 m²/kg.

According to a further aspect of the present invention, the use of the calcium carbonate-comprising material, as described herein, for paper filler and paper coating applications, cigarette paper applications, for plastics applications or in paints, coatings, adhesives, replacement of titanium dioxide, preferably in paints, sealants, food, feed, pharma, concrete, cement, cosmetic, water treatment and/or agriculture applications is provided.

According to one embodiment of the present process, the at least one dispersing agent is added exclusively during step e).

According to another embodiment of the present process, the at least one calcium carbonate-comprising material provided in the aqueous suspension of step a) is dolomite and/or a natural ground calcium carbonate (NGCC), such as one or more of marble, limestone and/or chalk.

According to yet another embodiment of the present process, the solid content of the substantially dispersant-free aqueous suspension of step a) is in the range from 15.0 to 50.0 wt.-% and preferably from 20.0 to 38.0 wt.-%, based on the total weight of the aqueous suspension.

According to one embodiment of the present process, the solid content of the aqueous suspension obtained in grinding step b) is in the range from 5.0 to 30.0 wt.-% and preferably from 10.0 to 20.0 wt.-%, based on the total weight of the aqueous suspension.

According to another embodiment of the present process, dewatering step c) is carried out a) in a vertical plate pressure filter, a tube press or a vacuum filter, preferably in a tube press, and/or b) under pressure, preferably a pressure from 20.0 to 140.0 bar, more preferably from 65.0 to 120.0 bar and most preferably from 80.0 to 110.0 bar.

According to one embodiment of the present process, the solid content of the filter cake obtained in dewatering step c) is in the range from 45.0 to 88.0 wt.-% and preferably in the range from 45.0 to 85.0 wt.-%, based on the total weight of the filter cake.

According to another embodiment of the present process, the process further comprises step f) of drying the filter cake obtained in step c) by a thermal method to obtain a filter cake having a solid content being above the solid content of the filter cake obtained in step c), preferably, the drying is carried out before or during deagglomerating step d).

According to yet another embodiment of the present process, the solid content of the filter cake obtained in the drying step is in the range from 45.0 to 99.0 wt.-% and preferably in the range from 60.0 to 90.0 wt.-%, based on the total weight of the filter cake.

According to one embodiment of the present process, the drying step is carried out at a temperature between 50 and 150° C., preferably between 60 and 130° C. and most preferably between 80 and 125° C.

According to another embodiment of the present process, the filter cake obtained in deagglomeration step d) comprises at least one calcium carbonate-comprising material having a weight median diameter $d_{50}$ in the range from 0.1 to 1.0 µm.

According to yet another embodiment of the present process, the at least one dispersing agent is selected from the group consisting of sodium, potassium, calcium, magnesium, lithium, strontium, primary amine, secondary amine, tertiary amine and/or ammonium salts, whereby the amine salts are linear or cyclic, of at least partly neutralized homopolymers or copolymers of (meth)acrylic acid, maleic acid, fumaric acid, itaconic acid and derivatives of these acids, preferably esters or amides such as methylmethacrylate, methylacrylate, acrylamide, sodium hydrogen phosphate or polyphosphates such as alkalipolyphosphates, carboxymethylcellulose, steric dispersants, comb polymers and/or mixtures thereof, preferably sodium polyacrylate having a molecular weight $M_w$ of from 4 000 to 10 000 g/mol, preferably from 4 000 to 8 000 g/mol and most preferably of about 6 000 g/mol.

According to one embodiment of the present process, the solid content of the aqueous suspension obtained in dispersing step e) is between 60.0 to 80.0 wt.-% and preferably between 70.0 and 75.0 wt.-%, based on the total weight of the aqueous suspension.

According to another embodiment of the present process, the process further comprises step g) of treating the at least one calcium carbonate-comprising material obtained in step d) or f) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain an aqueous suspension comprising a calcium carbonate comprising material comprising on at least a part of the accessible surface area a treatment layer comprising the hydrophobizing agent.

It should be understood that for the purpose of the present invention the following terms have the following meaning.

The term "calcium carbonate-comprising material" refers to a material that comprises at least 50.0 wt.-% calcium carbonate, based on the total dry weight of the calcium carbonate-comprising material.

Throughout the present document, the "particle size" of a calcium carbonate and other materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger and the remaining 50 wt.-% of grains smaller than this particle size. For the purpose of the present invention the particle size is specified as weight median particle size $d_{50}$ unless indicated otherwise. For determining the weight median particle size $d_{50}$ value a Sedigraph can be used. For the purpose of the present invention, the "particle size" of surface-reacted calcium carbonate is described as volume determined particle size distributions. For determining the volume determined particle size distribution, e.g. the volume median grain diameter ($d_{50}$) or the volume determined top cut particle size ($d_{98}$) of surface-reacted calcium carbonate, a Malvern Mastersizer 2000 can be used. The weight determined particle size distribution may correspond to the volume determined particle size if the density of all the particles is equal.

A "specific surface area (SSA)" of a calcium carbonate in the meaning of the present invention is defined as the surface area of the calcium carbonate divided by its mass. As used herein, the specific surface area is measured by nitrogen gas adsorption using the BET isotherm (ISO 9277:2010) and is specified in $m^2/g$.

The term "dewatering" in the meaning of the present invention means a reduction of water content and an increase of the solids content which is obtained by using a mechanical method.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

In the following, the details and preferred embodiments of the inventive process for the manufacturing of a calcium carbonate-comprising material will be described in more detail. It is to be understood that these technical details and embodiments also apply to the inventive calcium carbonate-comprising material and its use.

Step a): Providing a Substantially Dispersant-Free Aqueous Suspension

According to step a) of the instant process, a substantially dispersant-free aqueous suspension of at least one calcium carbonate-comprising material is provided. It is required that the aqueous suspension has a solid content in the range from 10.0 to 80.0 wt.-%, based on the total weight of the aqueous suspension.

It is appreciated that the at least one calcium carbonate-comprising material of step a) is provided in the form of an aqueous suspension. In this respect, the at least one calcium carbonate-comprising material provided in step a) may have any particle size distribution allowing the material to be subjected to a wet-grinding step. Therefore, the at least one calcium carbonate-comprising material may be provided as a comminuted material, for example, in crushed or preground form. Preferably, the at least one calcium carbonate-comprising material of step a) is provided in a preground form.

According to one embodiment the at least one calcium carbonate-comprising material of step a) is obtained by dry pregrinding. According to another embodiment of the present invention the at least one calcium carbonate-comprising material of step a) is obtained by wet pregrinding and optional subsequent drying.

In general, the pregrinding step for obtaining the at least one calcium carbonate-comprising material of step a) can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the at least one calcium carbonate-comprising material provided in step a) comprises a wet preground calcium carbonate-comprising material, the pregrinding step may be performed under conditions such that autogenous grinding takes place and/or by horizontal ball milling, and/or other such processes known to the skilled man. The wet processed preground calcium carbonate-comprising material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate-comprising material undergoes a beneficiation step, such as a flotation, bleaching or magnetic separation step, to remove impurities.

According to one embodiment, the at least one calcium carbonate-comprising material provided in step a) has a weight median particle size $d_{50}$ ranging from 0.1 to 200.0 µm, preferably from 0.2 to 100.0 µm, and more preferably from 0.5 to 50.0 µm, as measured by the sedimentation method.

The aqueous suspension of the at least one calcium carbonate-comprising material has solids content of from 10.0 wt.-% to 80.0 wt.-%, preferably from 15.0 wt.-% to 50.0 wt.-%, and most preferably from 20.0 wt.-% to 38.0 wt.-%, based on the total weight of the aqueous suspension. For example, the aqueous suspension of the at least one calcium carbonate-comprising material provided in step a) has solids content of from 25.0 wt.-% to 38.0 wt.-% or from 30.0 wt.-% to 38.0 wt.-%, based on the total weight of the aqueous suspension.

An aqueous "slurry" or "suspension" in the meaning of the present invention comprises insoluble solids and water and usually may contain large amounts of solids and, thus, can be more viscous and generally of higher density than the liquid from which it is formed.

The term "aqueous" slurry or suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

The water to be used for preparing the aqueous suspension of step a) is tap water, deionized water, process water or rain water, or a mixture thereof. Preferably, the water used for preparing the aqueous suspension of step a) is tap water.

It is one requirement of the instant process that the aqueous suspension of the at least one calcium carbonate-comprising material provided in step a) is substantially dispersant-free. That is to say, the aqueous suspension of the at least one calcium carbonate-comprising material provided in step a) preferably comprises a dispersant in an amount of ≤0.005 wt.-%, preferably of ≤0.002 wt.-% and most preferably of ≤0.0005 wt.-%, based on the total dry weight of the at least one calcium carbonate-comprising material.

The substantially dispersant-free aqueous suspension comprises at least one calcium carbonate-comprising material.

The term "at least one" calcium carbonate-comprising material in the meaning of the present invention means that the calcium carbonate-comprising material comprises, preferably consists of, one or more calcium carbonate-comprising material.

In one embodiment of the present invention, the at least one calcium carbonate-comprising material comprises, preferably consists of, one calcium carbonate-comprising material. Alternatively, the at least one calcium carbonate-comprising material comprises, preferably consists of, two or more calcium carbonate-comprising materials. For example, the at least one calcium carbonate-comprising material comprises, preferably consists of, two or three calcium carbonate-comprising materials.

Preferably, the at least one calcium carbonate-comprising material comprises, more preferably consists of, one calcium carbonate-comprising material.

According to one embodiment of the present invention, the at least one calcium carbonate-comprising material provided in the aqueous suspension of step a) is dolomite and/or natural ground calcium carbonate (NGCC). Preferably, the at least one calcium carbonate-comprising material is dolomite and natural ground calcium carbonate (NGCC). Alternatively, the at least one calcium carbonate-comprising material is dolomite or natural ground calcium carbonate (NGCC). Preferably, the at least one calcium carbonate-comprising material is natural ground calcium carbonate (NGCC).

The term "natural ground calcium carbonate" (NGCC) in the meaning of the present invention refers to a calcium carbonate obtained from natural sources, such as limestone, marble and/or chalk, and processed through a wet and/or dry treatment such as grinding, screening and/or fractionation, for example by a cyclone or classifier.

According to one embodiment of the present invention, the natural ground calcium carbonate (NGCC) is limestone, marble or chalk. More preferably, the natural ground calcium carbonate (NGCC) is limestone or marble. Most preferably, the natural ground calcium carbonate (NGCC) is marble.

"Dolomite" in the meaning of the present invention is a carbonatic calcium-magnesium-mineral having the chemical composition of $CaMg(CO_3)_2$ ("$CaCO_3.MgCO_3$"). Dolomite mineral contains at least 30.0 wt.-% $MgCO_3$, based on the total weight of dolomite, preferably more than 35.0 wt.-%, more preferably more than 40.0 wt.-% $MgCO_3$.

According to one embodiment of the present invention, the at least one calcium carbonate-comprising material comprises, preferably consists of, particles consisting of calcium carbonate in an amount of ≥50.0 wt.-%, preferably of 90.0 wt.-%, more preferably of ≥95.0 wt.-% and most preferably of ≥97.0 wt.-%, based on the total dry weight of the at least one at least one calcium carbonate-comprising material.

The term "dry" with regard to the at least one calcium carbonate-comprising material is understood to be a material having less than 0.3% by weight of water relative to the weight of the at least one calcium carbonate-comprising material. The % water is determined according to the Coulometric Karl Fischer measurement method, wherein the at least one natural source of calcium carbonate is heated to 220° C., and the water content released as vapour and isolated using a stream of nitrogen gas (at 100 ml/min) is determined in a Coulometric Karl Fischer unit.

Step b): Wet-Grinding the Aqueous Suspension

According to step b) of the instant process, the aqueous suspension as provided in step a) is wet-ground in at least one grinding step for obtaining an aqueous suspension of at least one calcium carbonate-comprising material having a weight median diameter $d_{50}$<0.4 µm.

It is appreciated that process step b) is preferably carried out in at least one grinding unit to obtain the wet ground calcium carbonate-comprising material.

The term "wet grinding" in the meaning of the process according to the present invention refers to the comminution (e.g. in a ball mill) of solid material (e.g. of mineral origin) in the presence of water meaning that said material is in form of an aqueous slurry or suspension.

For the purposes of the present invention, any suitable mill known in the art may be used. However, process step b) is preferably carried out in a vertical or horizontal ball mill, more preferably a vertical ball mill. Such vertical and horizontal ball mills usually consist of a vertically or horizontally arranged, cylindrical grinding chamber comprising an axially fast rotating agitator shaft being equipped with a plurality of paddles and/or stirring discs, such as described for example in EP 0607840 A1.

It is to be noted that process step b) is carried out by using at least one grinding unit, i.e. it is also possible to use a series of grinding units which may, for example, be selected from ball mills such as vertical or horizontal ball mills.

The amount of water being present during process step b) may be expressed by the total moisture content which is based on the total weight of said suspension. The process according to the present invention is characterized in that the grinding step is carried out at low solids contents, i.e. at high total moisture contents, for example at a total moisture content ranging from 70.0 to 95.0 wt.-%, based on the total weight of said suspension. According to one embodiment, the total moisture content during process step b) ranges from 80.0 to 90.0 wt.-%, based on the total weight of the aqueous suspension.

Thus, it is appreciated that the aqueous suspension of the at least one wet-ground calcium carbonate-comprising material during process step b) has solids content in the range from 5.0 to 30.0 wt.-% and most preferably from 10.0 to 20.0 wt.-%, based on the total weight of the aqueous suspension.

Thus, it is appreciated that process step b) is preferably carried out in that the aqueous suspension of the at least one calcium carbonate-comprising material provided in step a) is further diluted with water to the desired solids content during process step b).

Accordingly, the aqueous suspension of the at least one calcium carbonate-comprising material obtained in step b) has lower solids content than the aqueous suspension of the at least one calcium carbonate-comprising material provided in step a).

Thus, the aqueous suspension of the at least one calcium carbonate-comprising material obtained in process step b) has solids content in the range from 5.0 to 30.0 wt.-% and most preferably from 10.0 to 20.0 wt.-%, based on the total weight of the aqueous suspension.

It is also preferred that the Brookfield viscosity of the aqueous suspension of the at least one calcium carbonate-comprising material obtained in process step b) is from 50 to 2 500 mPa·s at 25° C., preferably from 100 to 1 500 mPa·s at 25° C., more preferably from 100 to 1 000 mPa·s at 25° C. and most preferably from 100 to 600 mPa·s at 25° C.

It is to be noted that process step b) is carried out such that the weight median particle size $d_{50}$ of the at least one calcium carbonate-comprising material obtained in step b) is decreased compared to the at least one calcium carbonate-comprising material provided in step a). Accordingly, the at least one calcium carbonate-comprising material obtained in step b) has a weight median diameter $d_{50}$ of <0.5 µm, as measured according to the sedimentation method. Preferably, the at least one calcium carbonate-comprising material obtained in step b) has a weight median diameter $d_{50}$ of <0.4 µm, as measured according to the sedimentation method.

In one embodiment, the at least one calcium carbonate-comprising material obtained in step b) has a weight median diameter $d_{50}$ of from 0.05 to <0.5 µm, preferably from 0.1 to <0.4 µm, and more preferably from 0.2 to <0.4 µm, as measured by the sedimentation method.

Additionally or alternatively, the at least one calcium carbonate-comprising material obtained in step b) has a content of particles <5 µm of >80 wt.-%, preferably >90 wt.-% and more preferably >95 wt.-%, as measured according to the sedimentation method. For example, the at least one calcium carbonate-comprising material obtained in step b) has a content of particles <5 µm of >98 wt.-% or of about 100 wt.-%, as measured according to the sedimentation method.

In one embodiment, the at least one calcium carbonate-comprising material obtained in step b) has a content of particles <2 µm of >80 wt.-%, preferably >90 wt.-% and more preferably >95 wt.-%, as measured according to the sedimentation method. For example, the at least one calcium carbonate-comprising material obtained in step b) has a content of particles <2 µm of >98 wt.-% or of about 100 wt.-%, as measured according to the sedimentation method.

Additionally or alternatively, the at least one calcium carbonate-comprising material obtained in step b) has a content of particles <1 µm of >80 wt.-%, preferably >90 wt.-% and more preferably >95 wt.-%, as measured according to the sedimentation method. For example, the at least one calcium carbonate-comprising material obtained in step b) has a content of particles <1 µm of >98 wt.-% or of about 100 wt.-%, as measured according to the sedimentation method.

In one embodiment, the at least one calcium carbonate-comprising material obtained in step b) has a content of particles <0.2 µm of <50 wt.-%, preferably <40 wt.-% and more preferably <30 wt.-%, as measured according to the sedimentation method. For example, the at least one calcium carbonate-comprising material obtained in step b) has a content of particles <0.2 µm in the range from 10 to 25 wt.-%, as measured according to the sedimentation method.

Preferably, the at least one calcium carbonate-comprising material obtained in step b) has a weight median diameter $d_{98}$ of 0.3 to 3.0 µm, more preferably of 0.5 to 2.0 µm, and most preferably of 0.5 to 1.5 µm, as measured according to the sedimentation method.

Accordingly, the at least one calcium carbonate-comprising material obtained in step b) has a BET specific surface area of from 4.0 to 15.0 m²/g, measured by nitrogen gas adsorption using the BET isotherm (ISO 9277:2010).

It is preferred that wet-grinding step b) is carried out in the absence of dispersing agents. Thus, the aqueous suspension obtained in wet-grinding step b) is preferably free of dispersing agents.

Wet-grinding step b) is preferably carried out at a starting temperature which is of about room temperature or of elevated temperature. For the purposes of the process according to the present invention, a temperature ranging from 15° C. to 85° C. is particularly suitable as starting temperature.

According to another embodiment, the starting temperature in wet-grinding step b) ranges from 15° C. to 60° C., preferably from 20° C. to 50° C. and most preferably from 20° C. to 40° C.

During wet-grinding step b), the temperature is allowed to rise above the starting temperature of process step b). For example, the temperature in wet-grinding step b) may rise to a temperature of up to 100° C.

Step c): Dewatering the Aqueous Suspension

According to step c) of the instant process, the aqueous suspension as obtained in step b) is dewatered by using a mechanical method to obtain a filter cake having a solid content in the range from 40.0 to 88.0 wt.-%, based on the total weight of the filter cake.

It is a specific requirement of the instant process that the aqueous suspension obtained in process step b) is subjected to a mechanical dewatering in process step c) such as to obtain a filter cake having a solid content in the range from 40.0 to 88.0 wt.-%, based on the total weight of the filter cake.

Such mechanical dewatering may be undertaken by all the techniques and methods well known to the man skilled in the art for reducing the water content of an aqueous suspension comprising at least one calcium carbonate-comprising material to solids content of 40.0 to 88.0 wt.-%, based on the total weight of the obtained filter cake.

The mechanical dewatering in process step c) is preferably carried out in a vertical plate pressure filter, a tube press or a vacuum filter. More preferably, dewatering step c) is carried out in a tube press.

A tube press is a membrane type filter press and capable of operating at high filtration pressures up to 150.0 bar. Preferably, dewatering step c) is carried out under pressure, even more preferably a pressure from 20.0 bar to 140.0 bar, more preferably from 65.0 bar to 120.0 bar and most preferably from 80.0 to 110.0 bar. The use of these high pressures enables a higher degree of separation of the liquid and solid phases. The principles of operation of a tube press are as follows:

The filtration takes place between two concentric cylinders. The outer cylinder is the casing, and the inner, the candle. The process slurry is pumped into the annular space between the filter medium and the bladder. Hydraulic fluid, usually water, is then pumped between the bladder and the casing putting the slurry under pressure and causing filtration to take place. When filtration is complete the hydraulic fluid is withdrawn from the tube unit using vacuum until the bladder is dilated against the casing. The candle is then lowered to the discharge position and a pulse of air is blown between the candle and the filter medium. This causes the filter cloth to expand, fracturing the cake which is discharged under gravity. When complete the candle closes to the slurry fill position to repeat the cycle.

The starting temperature of the mechanical dewatering of process step c) is preferably in the range of 15 to 99° C., preferably at a starting temperature in the range of 20 to 70° C., and more preferably at a starting temperature in the range of 30 to 60° C. For example, the starting temperature of the mechanical dewatering of process step c) is about 50° C.

The temperature during the mechanical dewatering of process step c) is preferably in the range of 15 to 99° C., preferably in the range of 20 to 70° C., and more preferably in the range of 30 to 60° C. For example, the temperature during the mechanical dewatering of process step c) is about 50° C.

It is one requirement of the instant invention that dewatering step c) is carried out such that a filter cake comprising the at least one calcium carbonate-comprising material is obtained. The filter cake thus has solids content of 40.0 wt.-% to 88.0 wt.-%, preferably from 45.0 wt.-% to 88.0 wt.-% and most preferably from 45.0 wt.-% to 85.0 wt.-%, based on the total weight of the filter cake.

It is preferred that dewatering step c) is carried out in the absence of dispersing agents. Thus, the filter cake comprising the at least one calcium carbonate-comprising material obtained in dewatering step c) is preferably free of dispersing agents.

The process according to the present invention may further comprise an optional drying step f). In said drying step, the filter cake obtained in dewatering step c) is dried to obtain a dried filter cake.

Thus, the process may further comprise a step f) of drying the filter cake obtained in step c) by a thermal method to obtain a filter cake having a solid content being above the solid content of the filter cake obtained in step c).

Preferably, the drying step f) is carried out before or during deagglomerating step d). More preferably, the drying step f) is carried out during deagglomerating step d).

In general, the drying step f) according to the present invention may be carried out by any thermal drying method known to the skilled person for drying materials in the range from 45.0 to 99.0 wt.-%, based on the total weight of the material.

Thus, the solid content of the filter cake obtained in the drying step f) is in the range from 45.0 to 99.0 wt.-% and preferably in the range from 60.0 to 90.0 wt.-%, based on the total weight of the filter cake.

If the process comprises a drying step f), it is appreciated that the drying step is carried out such that the obtained filter cake has a solid content being above the solid content of the filter cake obtained in dewatering step c).

According to one embodiment, the drying step is carried out in a cell mill as known by the skilled person. Preferably said drying step is carried out at a temperature ranging from 50 and 150° C., preferably from 60 to 130° C. and most preferably from 80 to 125° C.

Step d): Deagglomerating the Filter Cake

According to step d) of the instant process, the filter cake obtained in step c) is deagglomerated.

The term "deagglomerating" in the meaning of the present invention refers to the breaking up of agglomerates which may have formed during the dewatering step and/or the optional drying step.

It is thus required that deagglomerating step d) is carried out after dewatering step c). If the process comprises a drying step after dewatering step c), deagglomerating step d) can be carried out after the drying step or during the drying step. Preferably, deagglomerating step d) is carried out during the drying step.

According to one embodiment, the deagglomerating step d) is carried out in a cell mill as known by the skilled person. Preferably said deagglomerating step d) is carried out at a temperature ranging from 50 and 150° C., preferably from 60 to 130° C. and most preferably from 80 to 125° C.

The filter cake obtained in deagglomeration step d) comprises at least one calcium carbonate-comprising material having a weight median diameter $d_{50}$ in the range from 0.1 to 1.0 μm.

In one embodiment, the filter cake obtained in deagglomeration step d) comprises at least one calcium carbonate-comprising material having a weight median diameter $d_{50}$ of from 0.2 to 0.8 µm, preferably from 0.3 to 0.8 µm, and more preferably from 0.4 to 0.7 µm, as measured by the sedimentation method.

Additionally or alternatively, the filter cake obtained in deagglomeration step d) comprises at least one calcium carbonate-comprising material having a content of particles <2 µm of >70 wt.-%, preferably >80 wt.-% and more preferably >90 wt.-%, as measured according to the sedimentation method. For example, the filter cake obtained in deagglomeration step d) comprises at least one calcium carbonate-comprising material having a content of particles <2 µm of >95 wt.-%, as measured according to the sedimentation method.

Additionally or alternatively, the filter cake obtained in deagglomeration step d) comprises at least one calcium carbonate-comprising material having a content of particles <1 µm of >60 wt.-%, preferably >70 wt.-% and more preferably >80 wt.-%, as measured according to the sedimentation method. For example, the filter cake obtained in deagglomeration step d) comprises at least one calcium carbonate-comprising material having a content of particles <1 µm of >85 wt.-%, as measured according to the sedimentation method.

Preferably, the filter cake obtained in deagglomeration step d) comprises at least one calcium carbonate-comprising material having a weight median diameter $d_{98}$ of 0.3 to 4.0 µm, more preferably of 0.5 to 3.0 µm, and most preferably of 1.0 to 3.0 µm, as measured according to the sedimentation method.

Accordingly, the filter cake obtained in deagglomeration step d) comprises at least one calcium carbonate-comprising material having a BET specific surface area of from 4.0 to 15.0 m$^2$/g, measured by nitrogen gas adsorption using the BET isotherm (ISO 9277:2010).

It is preferred that deagglomeration step d) is carried out in the absence of dispersing agents. Thus, the filter cake obtained in deagglomeration step d) is preferably free of dispersing agents.

Step e): Dispersing the Filter Cake

According to step e) of the instant process, at least one dispersing agent is added to the deagglomerated filter cake obtained in step d) and the filter cake and the at least one dispersing agent are mixed to obtain an aqueous suspension having a solid content in the range from 60.0 to 80.0 wt.-%, based on the total weight of the aqueous suspension.

The expression "at least one" dispersing agent or dispersant means that one or more kind of a dispersing agent may be added to the deagglomerated filter cake obtained in step d).

According to one embodiment of the present invention, only one kind of a dispersing agent is added to the deagglomerated filter cake obtained in step d). According to another embodiment of the present invention, two or more kinds of a dispersing agent are added to the deagglomerated filter cake obtained in step d). For example, two or three kinds of a dispersing agent are added to the deagglomerated filter cake obtained in step d). Preferably, two kinds of a dispersing agent are added to the deagglomerated filter cake obtained in step d). Alternatively, only one kind of a dispersing agent is added to the deagglomerated filter cake obtained in step d).

In one embodiment of the present invention, the at least one dispersing agent is added exclusively during step e).

Alternatively, a further dispersing agent can be added after step e).

That is to say, the instant process is characterized in that it is performed in absence of any dispersing agent during process steps a), b), c) and d).

The at least one dispersing agent is preferably added to the deagglomerated filter cake obtained in step d) in an amount ranging from 0.001 wt.-% to 5.0 wt.-%, preferably from 0.001 wt.-% to 2.0 wt.-%, and most preferably from 0.05 wt.-% to 1.5 wt.-%, for example from 0.9 wt.-% to 1.1 wt.-%, based on the total dry weight of calcium carbonate-comprising material.

Conventional dispersing agents known to the skilled person can be used. According to another embodiment the at least one dispersing agent is selected from the group consisting of sodium, potassium, calcium, magnesium, lithium, strontium, primary amine, secondary amine, tertiary amine and/or ammonium salts, whereby the amine salts are linear or cyclic, of at least partly neutralized homopolymers or copolymers of (meth)acrylic acid, maleic acid, fumaric acid, itaconic acid and derivatives of these acids, preferably esters or amides such as methylmethacrylate, methylacrylate, acrylamide, sodium hydrogen phosphate or polyphosphates such as alkalipolyphosphates, carboxymethylcellulose, steric dispersants, comb polymers and/or mixtures thereof, preferably sodium polyacrylate having a molecular weight $M_w$ of from 4 000 to 10 000 g/mol, preferably from 4 000 to 8 000 g/mol and most preferably of about 6 000 g/mol.

For example, dispersing step e) is carried out by mixing the deagglomerated filter cake obtained in step d) and the at least one dispersing agent in water.

A sufficient mixing may be achieved by shaking the mixture of the deagglomerated filter cake obtained in step d) and the at least one dispersing agent or by agitation, which may provide a more thorough mixing. In one embodiment of the present invention, the mixing is carried out under agitation to ensure a thorough mixing of the deagglomerated filter cake obtained in step d) and the at least one dispersing agent. Such agitation can be carried out continuously or discontinuously. The skilled person will adapt the mixing conditions such as the mixing speed and temperature according to his process equipment.

The mixing may be carried out at room temperature, i.e. at 20° C.±2° C., or at other temperatures. According to one embodiment, the mixing is carried out at a temperature from 5 to 140° C., preferably from 10 to 110° C., and most preferably from 20 to 95° C. Heat may be introduced by internal shear or by an external source or a combination thereof.

The mixing of the deagglomerated filter cake obtained in step d) and the at least one dispersing agent to obtain an aqueous suspension having a solid content in the range from 50.0 to 80.0 wt.-%, based on the total weight of the aqueous suspension, can be performed by the use of any suitable means, and is preferably conducted by the use of a high sheer disperser.

An aqueous suspension having a solid content in the range from 50.0 to 80.0 wt.-%, based on the total weight of the aqueous suspension, is obtained in dispersing step e).

According to one embodiment, the solid content of the aqueous suspension obtained in dispersing step e) is between 60.0 to 80.0 wt.-% and preferably between 70.0 and 75.0 wt.-%, based on the total weight of the aqueous suspension.

In one embodiment of the present invention, the Brookfield Viscosity of the aqueous suspension obtained in dispersing step e) is in the range from 100 to 600 mPa·s, preferably from 150 to 550 mPa·s, more preferably from 200 to 500 mPa·s, even more preferably from 250 to 450 mPa·s, and most preferably from 300 to 400 mPa·s.

It is to be noted that the calcium carbonate-comprising material obtained in step e) has a weight median diameter $d_{50}$ of <0.4 µm, as measured according to the sedimentation method. In one embodiment, the calcium carbonate-comprising material obtained in step e) has a weight median diameter $d_{50}$ of from 0.05 to <0.4 µm, preferably from 0.1 to <0.4 µm, more preferably from 0.2 to <0.4 µm and most preferably from 0.3 to <0.4 µm, as measured by the sedimentation method.

Additionally or alternatively, the calcium carbonate-comprising material obtained in step e) has a content of particles <5 µm of >80 wt.-%, preferably >90 wt.-% and more preferably >95 wt.-%, as measured by the sedimentation method. For example, the calcium carbonate-comprising material obtained in step e) has a content of particles <5 µm of >98 wt.-%, as measured by the sedimentation method.

In one embodiment, the calcium carbonate-comprising material obtained in step e) has a content of particles <2 µm of >80 wt.-%, preferably >90 wt.-% and more preferably >94 wt.-%, as measured by the sedimentation method. For example, the calcium carbonate-comprising material obtained in step e) has a content of particles <2 µm of >95 wt.-%, as measured by the sedimentation method.

Additionally or alternatively, the calcium carbonate-comprising material obtained in step e) has a content of particles <1 µm of >70 wt.-% and preferably >80 wt.-%, as measured by the sedimentation method. For example, the calcium carbonate-comprising material obtained in step e) has a content of particles <1 µm of >85 wt.-%, as measured by the sedimentation method.

In one embodiment, the calcium carbonate-comprising material obtained in step e) has a content of particles <0.2 µm of <50 wt.-%, preferably <40 wt.-% and more preferably <30 wt.-%, as measured according to the sedimentation method. For example, the calcium carbonate-comprising material obtained in step e) has a content of particles <0.2 µm in the range from 10 to 25 wt.-%, as measured according to the sedimentation method.

Additionally or alternatively, the calcium carbonate-comprising material obtained in step e) has a weight median diameter $d_{98}$ of 0.3 to 5.0 µm, more preferably of 0.5 to 4.5 µm, and most preferably of 1.0 to 4.0 µm, as measured according to the sedimentation method.

Accordingly, the calcium carbonate-comprising material obtained in step e) has a BET-surface area in the range from 8.0 to 30.0 m²/g, preferably 10.0 to 25.0 m²/g and more preferably 11.0 to 20.0 m²/g, measured by nitrogen gas adsorption using the BET isotherm (ISO 9277:2010).

Additionally or alternatively, the calcium carbonate-comprising material obtained in step e) has excellent optical properties. For example, the calcium carbonate-comprising material obtained in step e) has a light scattering coefficient >175 m²/kg, preferably >190 m²/kg, more preferably >200 m²/kg, even more preferably >210 m²/kg, and most preferably >220 m²/kg.

In one embodiment of the present invention, the process further comprises a step g) of treating the at least one calcium carbonate-comprising material obtained in step d) or f) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain an aqueous suspension comprising a calcium carbonate comprising material comprising on at least a part of the accessible surface area a treatment layer comprising the hydrophobizing agent.

If the instant process comprises step g), it is appreciated that step g) can be carried out before or after step d).

It is to be noted that step g) is independent from step f). In other words, the process can comprise step f) or g). Alternatively, the process can comprise step f) and g).

If the instant process comprises step f) and g), it is appreciated that step f) can be carried out before or after deagglomerating step d). In case, step f) is carried out before deagglomerating step d), step g) is carried out before or after deagglomerating step d). In case step f) is carried out during deagglomerating step d), step g) is carried out after deagglomerating step d).

The hydrophobizing agent used in treatment step g) may be any agent known to the skilled person which is capable to form a hydrophobic treatment layer on at least a part of the accessible surface area of the calcium carbonate-comprising material particles.

The process step g) of treating the at least one calcium carbonate-comprising material obtained in step d) or f) with at least one mono-substituted succinic anhydride and/or with at least one phosphoric acid ester blend and suitable compounds for coating are described in EP 2 722 368 A1 and EP 2 770 017 A1, which are thus incorporated herewith by references.

Suitable aliphatic carboxylic acids for treating the at least one calcium carbonate-comprising material obtained in step d) or f) are for example aliphatic linear or branched carboxylic acids having between 4 and 24 carbon atoms.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

The inventors surprisingly found that according to the process of the present invention, a calcium carbonate-comprising material is thus obtainable having high gloss, high light scattering and highly absorptive coating structures.

The present invention thus refers in another aspect to a calcium carbonate-comprising material obtained by the process, as described herein.

With regard to the definition of the calcium carbonate-comprising material and preferred embodiments thereof, reference is made to the statements provided above when discussing the technical details of the process of the present invention.

In particular, the calcium carbonate-comprising material has
- i) a BET-surface area in the range from 8.0 to 30.0 $m^2/g$, preferably 10.0 to 25.0 $m^2/g$ and more preferably 11.0 to 20.0 $m^2/g$, and/or
- ii) a content of particles <1 μm of >70 wt.-%, preferably >80 wt.-% and more preferably >85 wt.-%, and/or
- iii) a Brookfield Viscosity in the range from 100 to 600 mPa·s, and/or
- iv) a light scattering coefficient >175 $m^2/kg$, preferably >190 $m^2/kg$, more preferably >200 $m^2/kg$, even more preferably >210 $m^2/kg$, and most preferably >220 $m^2/kg$.

For example, the calcium carbonate-comprising material has
- i) a BET-surface area in the range from 8.0 to 30.0 $m^2/g$, preferably 10.0 to 25.0 $m^2/g$ and more preferably 11.0 to 20.0 $m^2/g$, or
- ii) a content of particles <1 μm of >70 wt.-%, preferably >80 wt.-% and more preferably >85 wt.-%, or
- iii) a Brookfield Viscosity in the range from 100 to 600 mPa·s, or
- iv) a light scattering coefficient >175 $m^2/kg$, preferably >190 $m^2/kg$, more preferably >200 $m^2/kg$, even more preferably >210 $m^2/kg$, and most preferably >220 $m^2/kg$.

Alternatively, the calcium carbonate-comprising material has
- i) a BET-surface area in the range from 8.0 to 30.0 $m^2/g$, preferably 10.0 to 25.0 $m^2/g$ and more preferably 11.0 to 20.0 $m^2/g$, and
- ii) a content of particles <1 μm of >70 wt.-%, preferably >80 wt.-% and more preferably >85 wt.-%, and
- iii) a Brookfield Viscosity in the range from 100 to 600 mPas, and
- iv) a light scattering coefficient >175 $m^2/kg$, preferably >190 $m^2/kg$, more preferably >200 $m^2/kg$, even more preferably >210 $m^2/kg$, and most preferably >220 $m^2/kg$.

The inventive calcium carbonate-comprising material may be used for paper filler and paper coating applications, cigarette paper applications, for plastics applications or in paints, coatings, adhesives, sealants, replacement of titanium dioxide, preferably in paints, food, feed, pharma, concrete, cement, cosmetic, water treatment and/or agriculture applications As the calcium carbonate-comprising material has a low BET specific surface area, it may advantageously be used in paper coatings in order to adjust the printing and optical properties of a coated paper. Furthermore, the calcium carbonate-comprising material may also be used in paints which may lead to improved optical properties of surfaces being treated with such paints.

The use of the calcium carbonate-comprising material according to the present invention as a filler material in plastic applications may also be of particular advantage. For example, said calcium carbonate-comprising material may be used in thermoplastic polymers, such as polyvinyl chloride, polyolefins and polystyrene.

The following figures, examples and tests will illustrate the present invention, but are not intended to limit the invention in any way.

EXPERIMENTAL SECTION

1. Measurement Methods

In the following the measurement methods implemented in the examples are described.

Particle Size Distribution (Mass % Particles with a Diameter <X) and Weight Median Diameter ($d_{50}$) of a Particulate Material Sedigraph Weight grain diameter and grain diameter mass distribution of a particulate material were determined via the sedimentation method, i.e. an analysis of sedimentation behaviour in a gravitational field. The measurement was made with a Sedigraph™5120 or a Sedigraph™5100 of Micromeritics Instrument Corporation.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Laser Diffraction

Figure 1:
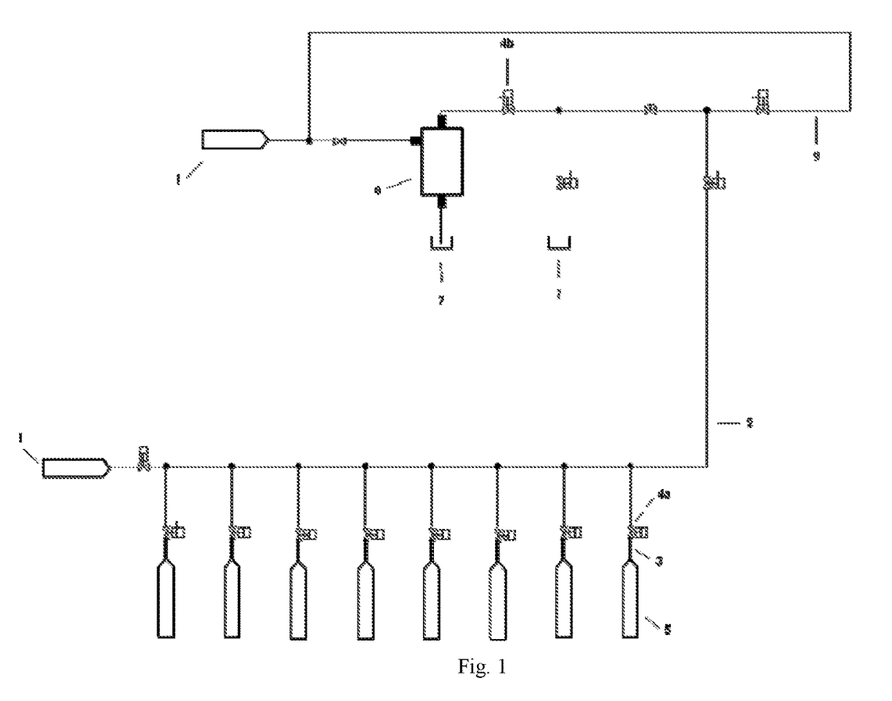

The particle size distribution was determined by using a Helos particle size analyser (Laser Diffraction System supplied by Sympatec GmbH, Germany) using the Fraunhofer light scattering approximation. The method and instrument are known to the skilled person and are commonly used to determine particle sizes of fillers and other particulate materials. The following setup was used for a water-based sampling wherein the sample was transported with water provided from water feed (1a) from the source (5) to the analyser (6). A 12 mm diameter stainless steel transport pipeline is connected to 8 process pipelines (3) through 8 valves (4a) (see FIG. 1). To get the sample into the transport pipeline one of the valves (4a) is opened for 3 seconds, releasing 0.5 l of the sample into the transport pipeline. The sample is transported to the analyser (6) using water as transport medium supplied by a dedicated pump (volume flow=7.15 l/min) and a valve (4b) is opened for 1 second when the sample has reached the analyser (6). Afterwards the analyser (6) dilutes the sample to 25% optical transmission and the measurement is carried out. The method allows multiplexing, i.e. sampling from several sources (5). Water is provided from a second water feed (1b) for cleaning the last stage of the transport line (2), the cleaning effect can be improved by providing hot water from the second water feed (1b). Transporting the sample without water may need a pipe to transport the sample back to the process. Since transportation with water requires a small sample, it might be acceptable not to have a pipe back to the process but to put the sample into the drain (7) after the measurement. Water based sampling reduces the risk of plugging and insufficient cleaning compared to pumping the product the same distance.

BET Specific Surface Area of a Material

Throughout the present document, the specific surface area (in $m^2/g$) of a particulate material was determined using the BET method (using nitrogen as adsorbing gas), which is well known to the skilled man (ISO 9277:1995). The total surface area (in $m^2$) of the particulate material is then obtained by multiplication of the specific surface area and the mass (in g) of the particulate material. The method and the instrument are known to the skilled person and are commonly used to determine the specific surface of particulate materials.

Suspension pH Measurement

The pH of a suspension is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Brookfield Viscosity

For the purpose of the present invention, the term "viscosity" or "Brookfield viscosity" refers to Brookfield viscosity. The Brookfield viscosity is for this purpose measured by a Brookfield (Type RVT) viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, and for a viscosity range between 800 and 3 200 mPa·s the spindle number 5 may be used.

Solids Content

Moisture Analyser

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Turbidity Measurement

Additionally the solids content was determined using a turbidity-meter (Relative Turbidity Meter ITM-3, NEGELE MESSTECHNIK GMBH, Germany). Since the turbidity-meter is a very sensitive instrument an average value of 5 seconds is taken. The turbidity meter was calibrated before each trial. The calibration was performed by first filling an experimental tank with 4 litres of water and measuring the turbidity. Then the tank was drained and filled with 4 litres of a product sample, each sample was stirred before the measurement to make sure that the sample is homogenous before noting down the turbidity value. Water was added in steps of 1 litre to measure turbidity at 20 different known solid contents. The solid content was calculated using a calibration curve giving the relation between solids content and turbidity. This method allows a more accurate measurement of solids content and reduce the cost for a measurement significantly. Best results are achieved at low concentrations (<15 wt.-% solids content), it is recommended not to use the turbidity method for solids contents >17 wt.-%. The method is very well suited for online determination of the solids content.

Pigment Whiteness, Light Scattering and CIELAB

Pigment Whiteness R457 by Light Scattering

Pigment whiteness R457 was measured using an ELREPHO 3000 from the company Datacolor according to ISO 2469:1994 (DIN 53145-2:2000 and DIN 53146:2000). The CIELAB L*, a*, b* coordinates were measured using an ELREPHO 3000 from the company Datacolor according to EN ISO 11664-4 and barium sulphate as standard.

Pigment Whiteness R457 by Turbidity Measurement

Additionally the pigment whiteness R457 was determined using a turbidity-meter (Relative Turbidity Meter ITM-3, NEGELE MESSTECHNIK GMBH, Germany). Since the turbidity-meter is a very sensitive instrument an average value of 5 seconds is taken. The turbidity meter was calibrated before each trial. The calibration was performed by filling an experimental tank with a mixture of product samples with different pigment whiteness R457 in different ratios. The ratio was changed in steps to measure turbidity at 10 different known pigment whiteness R457. The pigment whiteness R457 was calculated using a calibration curve giving the relation between pigment whiteness R457 and turbidity. This method reduces the cost for a measurement significantly. Best results are achieved at high solid content (>30 wt.-% solids content), it is recommended not to use the turbidity method for solids contents <25 wt.-%. The method is very well suited for online determination of the pigment whiteness R457.

Light Scattering Coefficient

The light scattering coefficient "S" was measured by preparing a paper coating colour using 10 parts (on dry basis) of Acronal™ S 360 D, BASF, a paper coating binder, and 90 parts (on dry basis) of the calcium carbonate suspension and coated on a plastic support (Synteape, Argo Wiggins) at a range of different coat weight using a laboratory coater Typ Model 624 from Ericksen, 58675 Hemer, Germany. All coating colours had, if not reported otherwise, a solid content of 45.0 wt.-%.

The light scattering coefficient S is measured according to the method described in US 2004/0250970, wherein the ability to scatter light is expressed by the Kubelka-Munk light scattering coefficient, determined by the method, well-known to experts, described in the publications of Kubelka and Munk (Zeitschrift für Technische Physik 12, 539 (1931)), and of Kubelka (J. Optical Soc. Am. 38 (5), 448 (1948) and J. Optical Soc. Am. 44 (4), 330 (1954)) and U.S. Pat. No. 5,558,850. The light scattering coefficient S is quoted as the value interpolated at 20 g/m².

Yellow Index

The yellow index (=YI) has been calculated by the following formula:

$$YI=100*(R_x-R_z)/R_y$$

Agglomerates

The agglomerate content has been determined according to ISO 3310.

2. Examples

The following starting materials have been used for the examples:

A natural $CaCO_3$ from Norway having a fineness corresponding to a $d_{50}$ value of 42 to 48 µm was employed as mineral pigment material.

The details of the dispersing agents used are summarized in Table 1 below.

TABLE 1

Dispersing agents.

| Compound | Chemical description |
|---|---|
| Dispersing agent 1 | Blend of a sodium neutralized polyacrylate dispersant ($M_w$ = 12 000 g/mol) and phosphoric acid; weight ratio = 70:30 |

TABLE 1-continued

Dispersing agents.

| Compound | Chemical description |
|---|---|
| Dispersing agent 2 | 100% sodium neutralized copolymer of acrylic acid and maleic acid ($M_w$ = 15 000 g/mol) |

Manufacturing of a Calcium Carbonate-Comprising Slurry (=Slurry 1)

Slurry 1 was obtained by wet grinding an aqueous slurry of marble ($d_{50}$=1.0 μm) having a solid content of 35.0 wt.-%, based on the total weight of the slurry and without addition of a dispersing agent. The slurry was wet ground in a vertical ball mill to a final particle size distribution as described in Table 2. The obtained Slurry 1 had solids content of 13.5 wt.-%, based on the total weight of the slurry after wet grinding.

TABLE 2

Properties of Slurry 1.

| Parameter | Value |
|---|---|
| Solids content [wt.-%][a] | 13.5 |
| Solids content [wt.-%][b] | 13.5 |
| Brookfield Viscosity [mPas] | 375 |
| PSD | Sedigraph |
| <5 μm [wt.-%] | 100 |
| <2 μm [wt.-%] | 100 |
| <1 μm [wt.-%] | 100 |
| <0.2 μm [wt.-%] | 16 |
| $d_{50}$ [μm] | 0.36 |
| $d_{98}$ [μm] | 0.83 |

Figure 2:
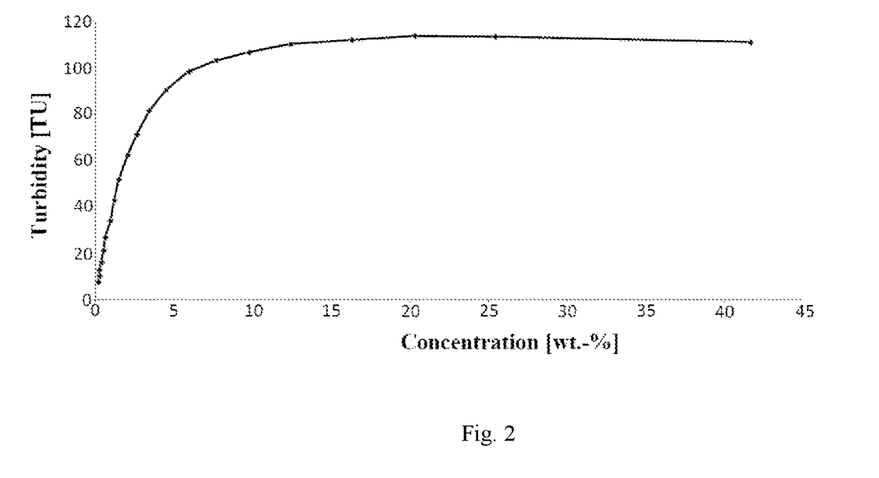

[a]Determined by moisture analysis,
[b]Determined by turbidity measurement (102.3 TU analyzed), for calibration curve see FIG. 2.

Comparative Example 1 (=CE1)

11 000 ppm dispersing agent 1 was added to Slurry 1 and the slurry was evaporated at 100° C. to obtain a solid content of 60 wt.-%. The properties of the final slurry are shown in Table 4 below.

Inventive Example 1 (=IE1)

Slurry 1 was dewatered by using a vertical tube press filter (Metso Corporation, Finland) operating at 95 bar and a temperature of 50° C. The pressure is reached by a hydraulic system. The solid content of the resulting filter cake was 76 wt.-%. The obtained filter cake was further dried and de-agglomerated by means of a cell mill (Jäkering, Germany) to obtain a powder having a solid content of 78 wt.-%. The cell mill was operated with a feed rate of 200 kg filter cake/h. The cell mill speed was set to 2 100 rpm, the classifier speed was 1 400 rpm and the process temperature was 120° C. The air circuit was operated with 3 000 m³/h. The properties of the obtained powder are summarized in Table 3 below. The powder was re-dispersed at a solid content of 72 wt.-% using 10 000 ppm dispersing agent 2. The properties of the final slurry are shown in Table 4 below.

TABLE 3

Properties of calcium-carbonate powder.

| Parameter | Value |
|---|---|
| Solid content [wt.-%] | 78.0 |
| PSD | |
| <2 μm [wt.-%] | 97.9 |
| <1 μm [wt.-%] | 86.2 |
| $d_{50}$ [μm] | 0.57 |
| $d_{98}$ [μm] | 2.0 |
| Specific area (BET) [m²/g] | 10.36 |
| Brightness | |
| Rx [%] | 95.4 |
| Ry [%] | 95.2 |
| Rz [%] | 94.2 |
| R457 TAPPI [%] | 94.2 |
| CIELAB L* | 98.1 |
| CIELAB a* | −0.1 |
| CIELAB b* | 0.7 |
| Yellowness Index | 1.3 |

TABLE 4

Properties of calcium-carbonate slurries.

| Parameter | Value CE1 | Value IE1 | Value CE1 | Value IE1 |
|---|---|---|---|---|
| Solid content [wt.-%] | 60.7 | 72.0 | | |
| Brookfield viscosity [mPas] | 185 | 333 | | |
| pH (Slurry) | 10.6 | 10.1 | | |
| PSD | Sedigraph | Sedigraph | Laser-Diffraction | Laser-Diffraction |
| <5 μm [wt.-%] | 99.8 | 98.3 | | |
| <2 μm [wt.-%] | 99.7 | 96.3 | 95.2 | 86.9 |
| <1 μm [wt.-%] | 98.7 | 88.0 | 74.0 | 62.5 |
| <0.2 μm [wt.-%] | 27.0 | 20.0 | | |
| $d_{50}$ [μm] | 0.32 | 0.39 | | |
| $d_{98}$ [μm] | 0.91 | 3.55 | | |
| Agglomerates | | | | |
| Sample weight [g] | 130.0 | 200.0 | | |
| >45 mm weight [g] | 0.120 | 0.53460 | | |
| >45 mm agglomerates [ppm] | 12 | 3711 | | |
| Brightness | Light Scattering | Light Scattering | Turbidity | Turbidity |
| R457 TAPPI [%] | 93.7 | 93.3 | 93.7 | 93.3 |
| CIELAB L* | 97.82 | 97.74 | | |
| CIELAB a* | −0.09 | −0.08 | | |
| CIELAB b* | 0.58 | 0.76 | | |
| Yellowness Index | 1.0 | 1.4 | | |
| Scattering Coefficient [m²/kg] | 225 | 222 | | |
| Specific area (BET) [m²/g] | 15.7 | 12.1 | | |

As can be gathered form Table 4 applying the inventive method gives a product with a light scattering coefficient at the same level than a product obtained by a process using a thermal dewatering method. This is surprising since the solid content is with 72 wt.-% more than 10 wt.-% higher than in the comparative example, showing a similar viscosity and a similar dispersant consumption. The particle size of the product obtained by the inventive process is coarser and also the BET-surface area is lower. However, this is even more surprising, since finer particles give higher light scattering values.

The invention claimed is:

1. A process for manufacturing a calcium carbonate-comprising material comprising the steps of:
   a) providing a substantially dispersant-free aqueous suspension of at least one calcium carbonate-comprising material, wherein (i) the at least one calcium carbonate-comprising material comprises dolomite, natural ground calcium carbonate (NGCC), or both, (ii) NGCC is a calcium carbonate obtained from a natural source, and (iii) the aqueous suspension has a solid content in the range from 10.0 to 80.0 wt.-%, based on the total weight of the aqueous suspension;
   b) wet-grinding the aqueous suspension provided in step a) in at least one grinding step to obtain an aqueous suspension of at least one calcium carbonate-comprising material having a weight median diameter $d_{50}<0.5$ µm;
   c) dewatering the aqueous suspension obtained in step b) in a tube press to obtain a filter cake having a solid content in the range from 40.0 to 88.0 wt.-%, based on the total weight of the filter cake;
   d) deagglomerating the filter cake obtained in step c) to obtain a deagglomerated filter cake comprising at least one calcium carbonate-comprising material having a $d_{50}$ in the range of 0.1 to 1.0 µm, wherein the deagglomeration is carried out in the absence of dispersing agents; and
   e) adding at least one dispersing agent to the deagglomerated filter cake obtained in step d) and mixing the filter cake and the at least one dispersing agent to obtain an aqueous suspension having a solid content in the range of 50.0 to 80.0 wt.-%, based on the total weight of the aqueous suspension.

2. The process according to claim 1, wherein the at least one dispersing agent is one or more of sodium, potassium, calcium, magnesium, lithium, strontium, primary amine, secondary amine, tertiary amine, and ammonium salts, whereby the amine salts are linear or cyclic, of at least partly neutralized homopolymers or copolymers of (meth)acrylic acid, maleic acid, fumaric acid, itaconic acid and derivatives of these acids, methylmethacrylate, methylacrylate, acrylamide, sodium hydrogen phosphate, polyphosphates, alkalipolyphosphates, carboxymethylcellulose, steric dispersants, or any mixture thereof.

3. The process according to claim 1, wherein the at least one dispersing agent is sodium polyacrylate having a molecular weight $M_w$ of from 4,000 to 10,000 g/mol.

4. The process according to claim 1, wherein the solid content of the aqueous suspension obtained in dispersing step e) is between 60.0 to 80.0 wt.-%, based on the total weight of the aqueous suspension.

5. The process according to claim 1, wherein the solid content of the aqueous suspension obtained in dispersing step e) is between 70.0 and 75.0 wt.-%, based on the total weight of the aqueous suspension.

6. The process according to claim 1, which further comprises treating the at least one calcium carbonate-comprising material obtained in step d) or a filter cake obtained by drying the filter cake obtained in step c) by a thermal method to obtain a filter cake having a solid content above the solid content of the filter cake obtained in step c), with at least one hydrophobizing agent to obtain an aqueous suspension comprising the calcium-carbonate comprising material comprising on at least a part of the accessible surface area a treatment layer comprising the hydrophobizing agent.

7. The process according to claim 6, wherein the hydrophobizing agent is selected from the group consisting of (i) an aliphatic carboxylic acid having a total amount of carbon atoms from C4 to C24, (ii) at least one mono-substituted succinic anhydride consisting of succinic anhydride mono-substituted with a group selected from a linear, branched, aliphatic and cyclic group having a total amount of carbon atoms from C2 to C30 in the substituent, (iii) a phosphoric acid ester blend of one or more phosphoric acid mono-ester and one or more phosphoric di-ester, and any mixture thereof.

8. The process according to claim 1, wherein the solid content of the substantially dispersant-free aqueous suspension of step a) is in the range from 15.0 to 50.0 wt.-%, based on the total weight of the aqueous suspension.

9. The process according to claim 1, wherein the solid content of the substantially dispersant-free aqueous suspension of step a) is in the range from 20.0 to 38.0 wt.-%, based on the total weight of the aqueous suspension.

10. The process according to claim 1, wherein the solid content of the aqueous suspension obtained in grinding step b) is in the range from 5.0 to 30.0 wt.-%, based on the total weight of the aqueous suspension.

11. The process according to claim 1, wherein dewatering step c) is carried out in the tube press under a pressure from 20.0 to 140.0 bar.

12. The process according to claim 1, wherein dewatering step c) is carried out in the tube press under a pressure from 65.0 to 120.0 bar.

13. The process according to claim 1, wherein dewatering step c) is carried out in the tube press under a pressure from 80.0 to 110.0 bar.

14. The process according to claim 1, wherein the solid content of the filter cake obtained in dewatering step c) is in the range from 45.0 to 88.0 wt.-%, based on the total weight of the filter cake.

15. The process according to claim 1, which further comprises step f) of drying the filter cake obtained in step c) by a thermal method to obtain a filter cake having a solid content being above the solid content of the filter cake obtained in step c).

16. The process according to claim 15, wherein the solid content of the filter cake obtained in the drying step is in the range from 45.0 to 99.0 wt.-%, based on the total weight of the filter cake.

17. The process according to claim 15, wherein the drying step is carried out at a temperature between 50 and 150° C.

18. The process according to claim 1, which further comprises step f) of drying the filter cake obtained in step c) by a thermal method to obtain a filter cake having a solid content being above the solid content of the filter cake obtained in step c), wherein the drying is carried out before or during deagglomerating step d).

19. The process according to claim 1, wherein the at least one dispersing agent is added exclusively during step e).

20. The process according to claim 1, wherein the at least one calcium carbonate-comprising material provided in the aqueous suspension of step a) is an NGCC.

21. The process according to claim 1, wherein the at least one calcium carbonate-comprising material provided in the aqueous suspension of step a) is marble, limestone, chalk or any mixture thereof.

* * * * *